United States Patent
Hiruma et al.

(10) Patent No.: US 12,422,182 B2
(45) Date of Patent: Sep. 23, 2025

(54) COOLING DEVICE AND COOLING METHOD INCLUDING HIGH HUMIDITY STORAGE AREA AND ADJUSTABLE FAN

(71) Applicant: MAYEKAWA MFG. CO., LTD., Tokyo (JP)

(72) Inventors: Naoya Hiruma, Tokyo (JP); Toru Ota, Tokyo (JP)

(73) Assignee: MAYEKAWA MFG. CO., LTD., Tokyo (JP)

(*) Notice: Subject to any disclaimer, the term of this patent is extended or adjusted under 35 U.S.C. 154(b) by 262 days.

(21) Appl. No.: 17/799,811

(22) PCT Filed: Feb. 16, 2021

(86) PCT No.: PCT/JP2021/005598
§ 371 (c)(1),
(2) Date: Aug. 15, 2022

(87) PCT Pub. No.: WO2021/166870
PCT Pub. Date: Aug. 26, 2021

(65) Prior Publication Data
US 2023/0073605 A1  Mar. 9, 2023

(30) Foreign Application Priority Data
Feb. 18, 2020 (JP) ................................. 2020-025511

(51) Int. Cl.
F25D 17/06 (2006.01)
F25D 19/00 (2006.01)
F25D 23/00 (2006.01)

(52) U.S. Cl.
CPC ............ *F25D 23/00* (2013.01); *F25D 17/06* (2013.01); *F25D 19/00* (2013.01);
(Continued)

(58) Field of Classification Search
CPC .................. F25B 2400/0403; F25B 2400/0409
See application file for complete search history.

(56) References Cited

U.S. PATENT DOCUMENTS 5,031,413 A * 7/1991 Tsuihiji ............... F25B 5/02
  62/282
6,763,677 B1 * 7/2004 Burchill ............... F25D 29/003
  62/176.1
(Continued)

FOREIGN PATENT DOCUMENTS

CN   1871480 A    11/2006
JP   S55154921 U  11/1980
(Continued)

OTHER PUBLICATIONS

Office Action (Notice of Reasons for Refusal) issued May 30, 2023, by the Japan Patent Office in corresponding Japanese Patent Application No. 2022-501886 and an English translation of the Office Action. (12 pages).

(Continued)

*Primary Examiner* — Jerry-Daryl Fletcher
*Assistant Examiner* — Daniel C Comings
(74) *Attorney, Agent, or Firm* — BUCHANAN INGERSOLL & ROONEY PC

(57) ABSTRACT

To provide a cooling device that can refrigerate foods and stably maintain high humidity without being limited by a region and a period. A cooling device includes a heat exchange unit that performs heat exchange between a refrigerant circulating in a freezer and air circulating in a box and an adjusting unit that maintains a state in which moisture adheres to heat transfer units of the heat exchange unit.

10 Claims, 6 Drawing Sheets

(52) U.S. Cl.
CPC ............... *F25B 2700/21174* (2013.01); *F25D 2317/04131* (2013.01); *F25D 2317/06* (2013.01)

(56) References Cited

U.S. PATENT DOCUMENTS

| | | | | |
|---|---|---|---|---|
| 2003/0145611 | A1* | 8/2003 | McGill | F25D 17/062 |
| | | | | 62/278 |
| 2008/0178621 | A1 | 7/2008 | Kang | |
| 2010/0131106 | A1* | 5/2010 | Kriangkanont | F25B 49/02 |
| | | | | 700/275 |
| 2011/0100593 | A1* | 5/2011 | Benz | F28D 1/0477 |
| | | | | 165/59 |
| 2013/0213073 | A1* | 8/2013 | Fritz | F25D 17/067 |
| | | | | 165/173 |

FOREIGN PATENT DOCUMENTS

| | | | | |
|---|---|---|---|---|
| JP | S59231374 | A | 12/1984 | |
| JP | H09196544 | A | 7/1997 | |
| JP | 2001045878 | A | 2/2001 | |
| JP | 2001120161 | A | 5/2001 | |
| JP | 2004294008 | A | 10/2004 | |
| JP | 2015052429 | A | 3/2015 | |
| WO | WO-2004097315 | A1 * | 11/2004 | ............ F25D 11/003 |
| WO | WO-2014019440 | A1 * | 2/2014 | ............ A61L 9/205 |
| WO | WO-2016113899 | A1 * | 7/2016 | ............ F25B 13/00 |
| WO | 2019203252 | A1 | 10/2019 | |

OTHER PUBLICATIONS

International Search Report (PCT/ISA/210) with translation and Written Opinion (PCT/ISA/237) mailed on Apr. 20, 2021, by the Japanese Patent Office as the International Searching Authority for International Application No. PCT/JP2021/005598. (13 pages).

Office Action (The First Office Action) issued on Oct. 31, 2024, in corresponding Chinese Patent Application No. 202180009108.5 and English translation of the Office Action. (14 pages).

The Second Office Action issued on May 13, 2025, by the State Intellectual Property Office of the People's Republic of China in corresponding Chinese Patent Application No. 202180009108.5 and an English translation of the Office Action. (18 pages).

* cited by examiner

COOLING DEVICE AND COOLING METHOD INCLUDING HIGH HUMIDITY STORAGE AREA AND ADJUSTABLE FAN

TECHNICAL FIELD

The present invention relates to a cooling device and a cooling method and, more particularly, to a cooling device and a cooling method for cooling foods at high humidity.

BACKGROUND ART

A refrigeration storage house in which snow is used has been known in a snowfall region as a refrigeration storage house that stores fresh vegetables and the like while maintaining freshness. In such a refrigeration storage house, vegetables and the like are stored in the refrigeration storage house and air in the refrigeration storage house is cooled by the snow. The cold air naturally circulates and cools the vegetables and the like. At this time, the inside of the refrigeration storage house is humidified by melted water to maintain the inside of the refrigeration storage house at high humidity.

However, if the snow melts away, refrigeration storage cannot be performed. In other words, the refrigeration storage house explained above has a problem in that the refrigeration storage house can be used only in a limited region and for a limited period.

Therefore, as a solution to this problem, a refrigeration storage house including a freezer and a humidifier has been put to practical use. The freezer is configured by, for example, a compressor, a condenser, an expansion valve, an evaporator. The humidifier is not particularly limited and is, for example, a humidifier of a water spraying type.

In such a refrigeration storage house, vegetables and the like are stored in the refrigeration storage house, air in the refrigeration storage house is cooled by a refrigerant of the freezer, and the cold air is forcibly circulated by a fan to cool the vegetables and the like. At this time, the humidifier sprays water to maintain the inside of the refrigeration storage house at high humidity.

However, in the refrigeration storage house including the freezer and the humidifier, since dehumidification is performed by the freezer and humidification is performed by the humidifier, excessive humidification and humidification insufficiency occur and high humidity cannot be stably maintained. Further, it is likely that mist droplets emitted from the humidifier drop in the air and touch the vegetables and the like to cause corrosion and mold.

SUMMARY OF INVENTION

The present invention has been devised in order to solve the problems described above and an object of the present invention is to provide a cooling device and a cooling method that can refrigerate foods and stably maintain high humidity without being limited by a region and a period.

A cooling device according to the present invention that achieves the object is a cooling device that cools foods in a box at high humidity. The cooling device includes: a heat exchange unit that performs heat exchange between a medium circulating in the cooling device and air circulating in the box; and an adjusting unit that maintains a state in which moisture adheres to a heat transfer unit of the heat exchange unit.

A cooling method according to the present invention that achieves the object is a cooling method for cooling foods in a box at high humidity. The cooling method includes, in a state adjusted to maintain a state in which moisture adheres to a heat transfer unit of a heat exchange unit that performs heat exchange between a medium circulating in a cooling device and air circulating in the box, causing the air to flow to the heat exchanger.

With the cooling device and the cooling method explained above, the air flows in the heat exchange unit in the state in which the moisture adheres to the heat transfer unit of the heat exchange unit, whereby water vapor cooled while maintaining high humidity is generated. The foods are cooled at high humidity by the generated water vapor cooled while maintaining the high humidity. Therefore, it is possible to refrigerate foods and stably maintain high humidity without being limited by a region and a period.

DESCRIPTION OF EMBODIMENTS

First Embodiment

Figure 1:
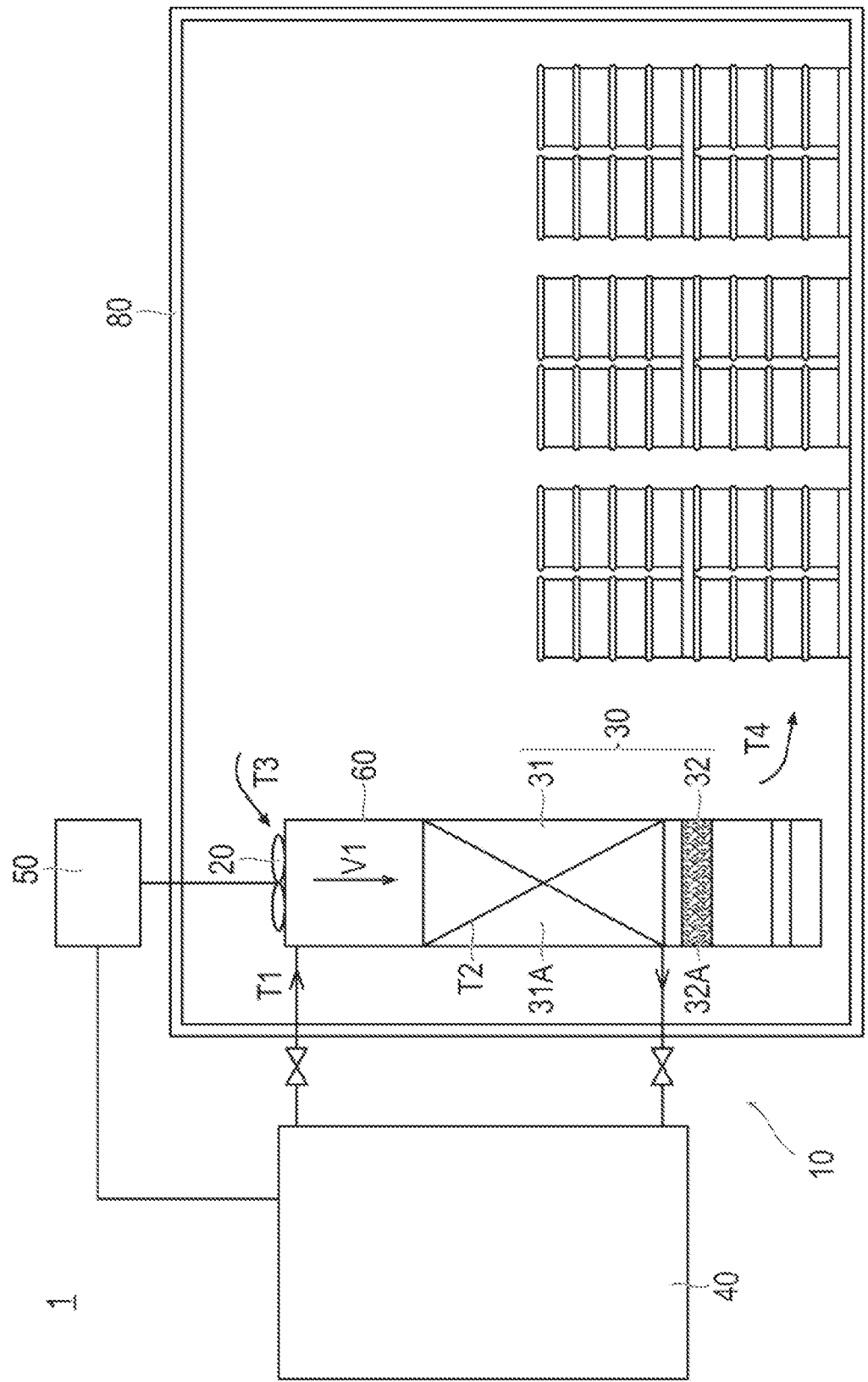
FIG. 1 is a schematic diagram showing a cooling device according to a first embodiment of the present invention.

A first embodiment of the present invention is explained with reference to FIG. 1 to FIG. 3. Note that, in the explanation of the drawings, the same components are denoted by the same reference numerals and signs and redundant explanation of the components is omitted. Dimension ratios of the drawings are exaggerated for convenience of explanation and are sometimes different from actual ratios.

FIG. 1 is a schematic diagram showing a cooling device 1 according to the first embodiment. FIG. 2 is a schematic diagram showing a cooling device 800 according to a comparative example including a freezer 810 and a humidifier 820. FIG. 3 is a graph showing a temporal change of humidity in a box at the time when the cooling device 800 according to the comparative example including the freezer 810 and the humidifier 820 is used.

The cooling device 1 according to the first embodiment includes, as shown in FIG. 1, a generating unit 10 and a housing 80. The cooling device according to the embodiment of the present invention can be disposed in a permanently installed refrigeration storage house and a truck for physical distribution. The components are explained below.

The generating unit 10 brings moisture adhering to heat transfer units 31A and 32A of a heat exchange unit 30 into contact with air flowing into the generating unit 10 to thereby generate water vapor cooled while maintaining high humidity. The generating unit 10 includes, as shown in FIG. 1, a fan 20, the heat exchange unit 30, a freezer 40, an adjusting unit 50, and a casing 60. The fan 20 and the heat exchange unit 30 are configured to be covered by the housing 80. The housing 80 includes a heat insulating wall.

As shown in FIG. 1, the fan 20 is provided above the heat exchange unit 30. The fan 20 sucks air after foods have been cooled at high humidity and blows the air toward the heat exchange unit 30. That is, the fan 20 takes in, from above, the air after the foods have been cooled at high humidity and blows the air downward (see an arrow V1 in FIG. 1). The cooling at high humidity means cooling the foods in a state in which humidity is 80% or higher.

The heat exchange unit 30 performs heat exchange between a refrigerant (equivalent to a medium) cooled by the cooling devices 1 and 2 and air circulating in the box and cools the air flowing in the heat exchange unit 30. The heat exchange unit 30 includes, as shown in FIG. 1, a heat exchanger 31 and a nonwoven fabric filter 32.

In the first embodiment, the heat exchanger 31 is a fin coil type. In order to increase a heat transfer coefficient of the heat exchanger 31, it is preferable to reduce a pipe diameter of a fin coil and increase the number of rows and the number of stages of the fin coil to reduce a fin pitch. Note that the pipe diameter of the fin coil, the number of rows and the number of stages of the fin coil, and the fin pitch are not particularly limited.

The surface of the fin coil-type heat exchanger 31 is configured as the heat transfer unit 31A that transfers cold of the refrigerant to the air. In the heat transfer unit 31A of the heat exchanger 31, a state in which moisture included in the air and the foods adheres thereto is maintained by the adjusting unit 50.

The nonwoven fabric filter 32 is provided to increase a moving length in which the air moves. The surface of the nonwoven fabric filter 32 is configured as the heat transfer unit 32A that transfers cold of the refrigerant to the air. In the heat transfer unit 32A of the nonwoven fabric filter 32, a state in which moisture included in the air and the foods adheres thereto is maintained by the adjusting unit 50.

The cooling device 1 is called "indirect expansion cooling type". The freezer 40 cools the refrigerant, performs heat exchange between the refrigerant and a cooling/heating medium (brine or $CO_2$), and transfers the cooled cooling/heating medium with a pump to cool the air in the heat exchanger 31.

The adjusting unit 50 maintains a state in which the moisture included in the air and the foods adheres to the heat transfer unit 31A of the heat exchanger 31 and the heat transfer unit 32A of the nonwoven fabric filter 32. Specifically, the adjusting unit 50 adjusts an inlet temperature T1 of the refrigerant, which circulates in the freezer 40, entering the heat exchange unit 30 and rotating speed of the fan 20 to thereby maintain the state in which the moisture included in the air and the foods adheres to the heat transfer unit 31A of the heat exchanger 31 and the heat transfer unit 32A of the nonwoven fabric filter 32. The adjusting unit 50 instructs a valve to be in the same direction or the opposite direction with respect to a direction in which the air flows, switches the valve, and circulates the refrigerant. The adjusting unit 50 is a CPU.

The adjusting unit 50 adjusts the inlet temperature T1 of the refrigerant, which circulates in the freezer 40, entering the heat exchange unit 30 such that a temperature difference ($\Delta Tm$) between temperature T2 of the heat transfer unit 31A of the heat exchanger 31 (a surface temperature of a coil) and temperature T3 of taken-in air is as small as possible. For example, when the temperature T3 of air entering the fan 20 is 2° C. and temperature T4 of air blown from the fan 20, passing through the heat exchange unit 30, and blown out is 0.5° C., the adjusting unit 50 adjusts the inlet temperature T1 of the refrigerant, which circulates in the freezer 40, entering the heat exchange unit 30 to be −0.5° C.

In this way, the adjusting unit 50 reduces the temperature difference ($\Delta Tm$) between temperature T2 of the heat transfer unit 31A of the heat exchanger 31 (the surface temperature of the coil) and the temperature T3 of the taken-in air. Consequently, it is possible to suitably suppress dehumidification associated with cooling at the time when the air passes through the heat exchange unit 30 and maintain high humidity.

It is preferable that the adjusting unit 50 maintain a state in which the heat transfer units 31A and 32A of the heat exchange unit 30 do not freeze and moisture adheres to the heat transfer units 31A and 32A. By maintaining the state in which the moisture adheres in this way, it is possible to set a heat transfer coefficient in the heat transfer units 31A and 32A of the heat exchange unit 30 to a predetermined numerical value (for example, 30 $W/(m^2 \cdot k)$) or more and suitably cool the air.

Figure 2:
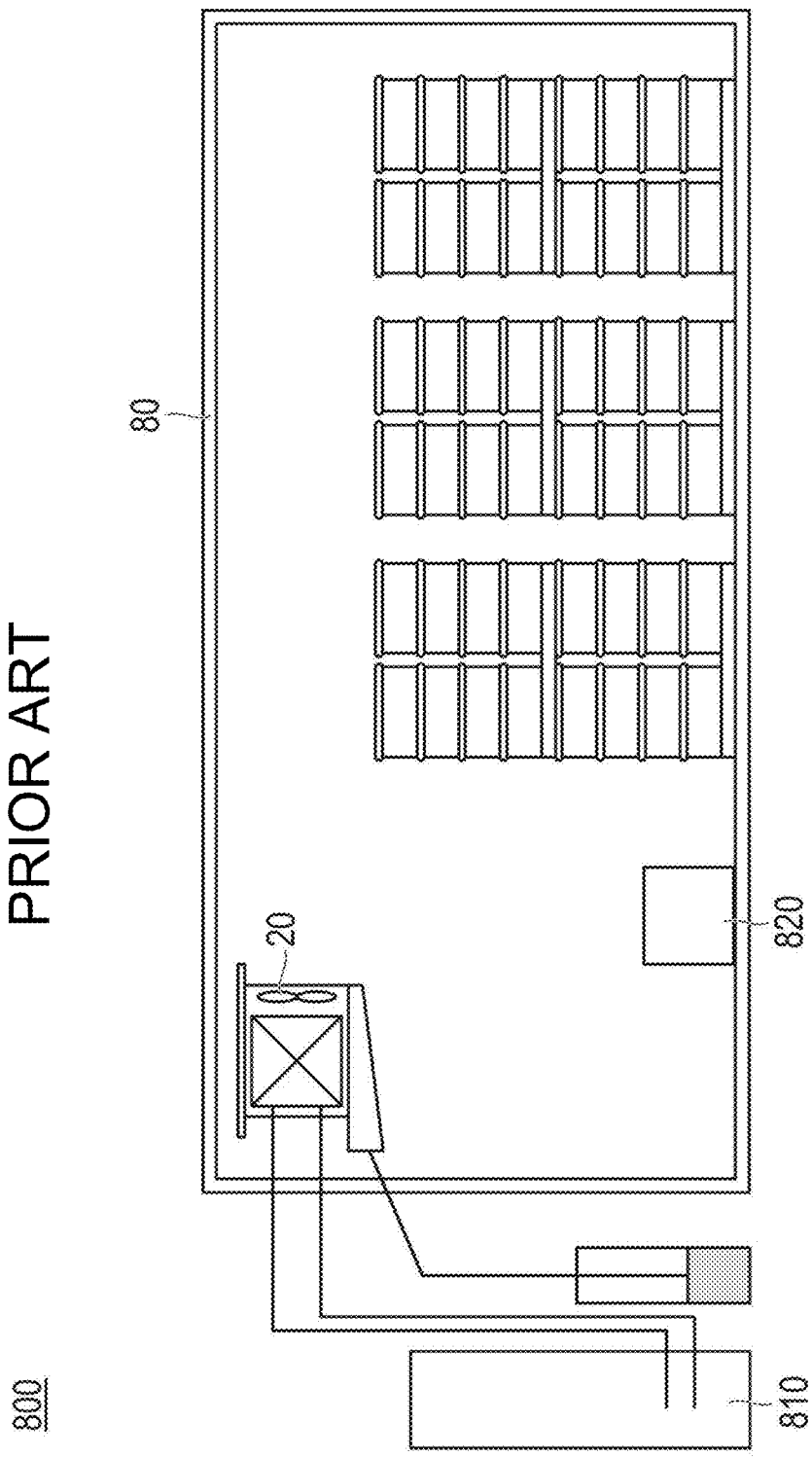
FIG. 2 is a schematic diagram showing a cooling device according to a comparative example including a freezer and a humidifier.
Figure 3:
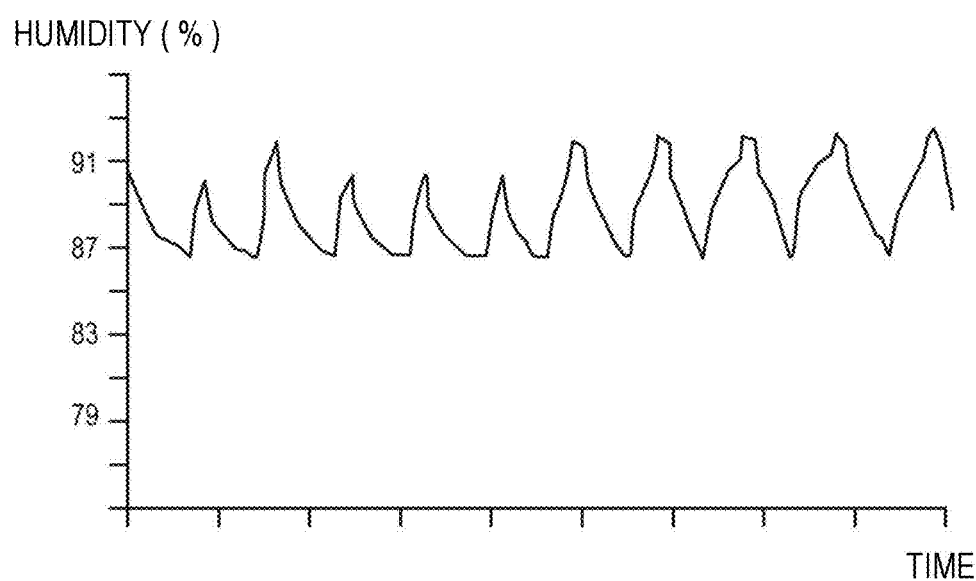
FIG. 3 is a graph showing a temporal change of humidity in a box at the time when the cooling device according to the comparative example including the freezer and the humidifier is used.

For example, in the case of the cooling device 800 including the freezer 810 and the humidifier 820 as shown in FIG. 2, since dehumidification is performed by the freezer 810 and humidification is performed by the humidifier 820, as shown in FIG. 3, humidity fluctuates and high humidity cannot be stably maintained. As a result, it is likely that, for example, vegetables wilt because of drying and mold is caused by dew condensation. When mist is jetted by the humidifier 820, it is likely that fog covers the inside of the box and visibility is deteriorated. Frost is caused in the freezer 810 by the mist jetted by the humidifier 820 and the freezer 810 is defrosted. Therefore, cooling cannot be performed by the freezer during the defrosting.

In contrast, with the cooling device 1 according to the first embodiment, by reducing $\Delta Tm$, it is possible to suitably suppress dehumidification during cooling and maintain high humidity. With the cooling device 1 according to the first embodiment, since mist is not jetted and the moisture included in the foods and the air is used, it is possible to prevent visibility from being deteriorated. Further, with the cooling device 1 according to the first embodiment, since mist is not jetted and the moisture included in the air and the foods is used, it is possible to reduce possibility of occurrence of frost.

For example, when the surface of the fin coil-type heat exchanger 31 is wetted using a sprinkler disclosed in Japanese Patent Laid-Open No. 2001-45878, since the sprinkler is added to equipment, the entire cooling device increases in size. Further, water needs to be introduced from the outside, which requires a lot of work.

In contrast, with the cooling device 1 according to the first embodiment, the sprinkler is not provided and the heat transfer unit 31A of the fin coil-type heat exchanger 31 is wetted by the moisture included in the air and the foods. Accordingly, the sprinkler is unnecessary and it is possible to simplify equipment.

The adjusting unit 50 adjusts the rotating speed of the fan 20 and adjusts face velocity of the air entering the heat exchanger 31 such that the moisture adhering to the heat transfer unit 31A of the fin coil-type heat exchanger 31 does not evaporate and the wet state is maintained. The face velocity of the air entering the heat exchanger 31 is not particularly limited and is preferably, for example, 2.5 m/second or lower. By setting the face velocity to 2.5 m/second or lower in this way, it is possible to suitably maintain the wet state of the heat transfer unit 31A of the heat exchanger 31.

Subsequently, a cooling method of the cooling device 1 according to the first embodiment is explained as an example 1 with reference to FIG. 1. Note that the present invention is not limited to only the example explained below.

As shown in FIG. 1, the adjusting unit 50 adjusts the inlet temperature T1 of the refrigerant, which circulates in the freezer 40, entering the heat exchange unit 30 to be −0.5° C. such that the heat transfer units 31A and 32A of the heat exchange unit 30 do not freeze.

In this state, the adjusting unit 50 circulates the refrigerant such that a direction of the circulation coincides with a direction in which the air flows (the downward direction).

The adjusting unit 50 adjusts the rotating speed of the fan 20 such that the face velocity of the air entering the heat exchanger 31 is 2.5 m/second or lower.

In this state, by circulating the air in the housing 80, for example, the air, the temperature T3 of which is 2° C., taken into the casing 60 is cooled while maintaining high humidity in the heat exchange unit 30 to thereby be blown out from the casing 60 as water vapor, the temperature T4 of which is 0° C. and the humidity of which is 100%. When the water vapor that has cooled the vegetables and the like placed on the inside of the housing 80 at high humidity and has been used for high-humidity cooling returns to the casing 60, for example, the temperature T4 is 0.5° C., the temperature T3 is 2° C., and the humidity is 92%.

Subsequently, a cooling method of the cooling device 1 according to the first embodiment is explained as an example 2 with reference to FIG. 1. Note that the present invention is not limited to only the example explained below.

As shown in FIG. 1, the adjusting unit 50 adjusts the inlet temperature T1 of the refrigerant, which circulates in the freezer 40, entering the heat exchange unit 30 to be −0.3° C. such that the heat transfer units 31A and 32A of the heat exchange unit 30 do not freeze.

In this state, the adjusting unit 50 circulates the refrigerant in the opposite direction (the upward direction) of the direction in which the air flows (the downward direction). That is, the adjusting unit 50 circulates the refrigerant to move backward with respect to the direction in which the air flows.

The adjusting unit 50 adjusts the rotating speed of the fan 20 such that the face velocity of the air entering the heat exchanger 31 is 2.5 m/second or lower.

In this state, by circulating the air in the housing 80, for example, the air, the temperature T3 of which is 2° C., taken into the casing 60 is cooled while maintaining high humidity in the heat exchange unit 30 to thereby be blown out from the casing 60 as water vapor, the temperature T4 of which is 0° C. and the humidity of which is 100%. When the water vapor that has cooled the vegetables and the like placed on the inside of the housing 80 at high humidity and has been used for high-humidity cooling returns to the casing 60, for example, the temperature T3 is 2° C. and the humidity is 92%.

As explained above, the cooling device 1 according to the first embodiment is the cooling device 1 that cools foods in the box at high humidity. The cooling device 1 includes the heat exchange unit 30 that performs heat exchange between the refrigerant circulating in the cooling device 1 and the air circulating in the box and the adjusting unit 50 that maintains a state in which moisture adheres to the heat transfer units 31A and 32A of the heat exchange unit 30. Air flows in the heat exchange unit 30, whereby water vapor cooled while maintaining high humidity is generated. With the cooling device 1 configured in this way, it is possible to refrigerate foods and stably maintain high humidity without being limited by a region and a period.

The adjusting unit 50 maintains a state in which moisture included in the air and the foods adheres to the heat transfer units 31A and 32A. With the cooling device 1 configured in this way, it is possible to maintain the state in which the moisture adheres to the heat transfer units 31A and 32A of the heat exchange unit 30 without using a sprinkler. Therefore, it is possible to simplify equipment.

The cooling device 1 further includes the fan 20 that takes in the air in the box in which the foods have been cooled at high humidity and blows the air toward the heat exchange unit 30. The fan 20, the heat exchange unit 30, and an outlet for the water vapor cooled while maintaining high humidity are disposed in this order from an air intake port. With the cooling device 1 configured in this way, since generated heat of the fan can be removed by the heat exchange unit, it is possible to more suitably circulate the air cooled while maintaining high humidity. Note that outlet blowout of the water vapor cooled while maintaining high humidity may be either from an upper part or from a lower part.

A direction in which the air cooled while maintaining high humidity and a direction in which the refrigerant flows are the same. With this configuration, since freezing less easily occurs, it is possible to suitably cool the air.

The heat exchange unit 30 includes the heat exchanger 31 and the nonwoven fabric filter 32. With this configuration, since the nonwoven fabric filter 32 is provided, it is possible to more suitably cause the air to have high humidity.

As explained above, the cooling method according to the first embodiment is a cooling method for cooling the foods in the box at high humidity. The cooling method includes, in a state adjusted to maintain a state in which moisture adheres to the heat transfer units 31A and 32A of the heat exchange unit 30 that performs heat exchange between the medium circulating in the freezer 40 and the air circulating in the box, causing the air to flow to the heat exchange unit 30 and generating water vapor cooled while maintaining high humidity. With the cooling method, it is possible to refrigerate the foods and stably maintain high humidity without being limited by a region and a period.

Second Embodiment

Figure 4:
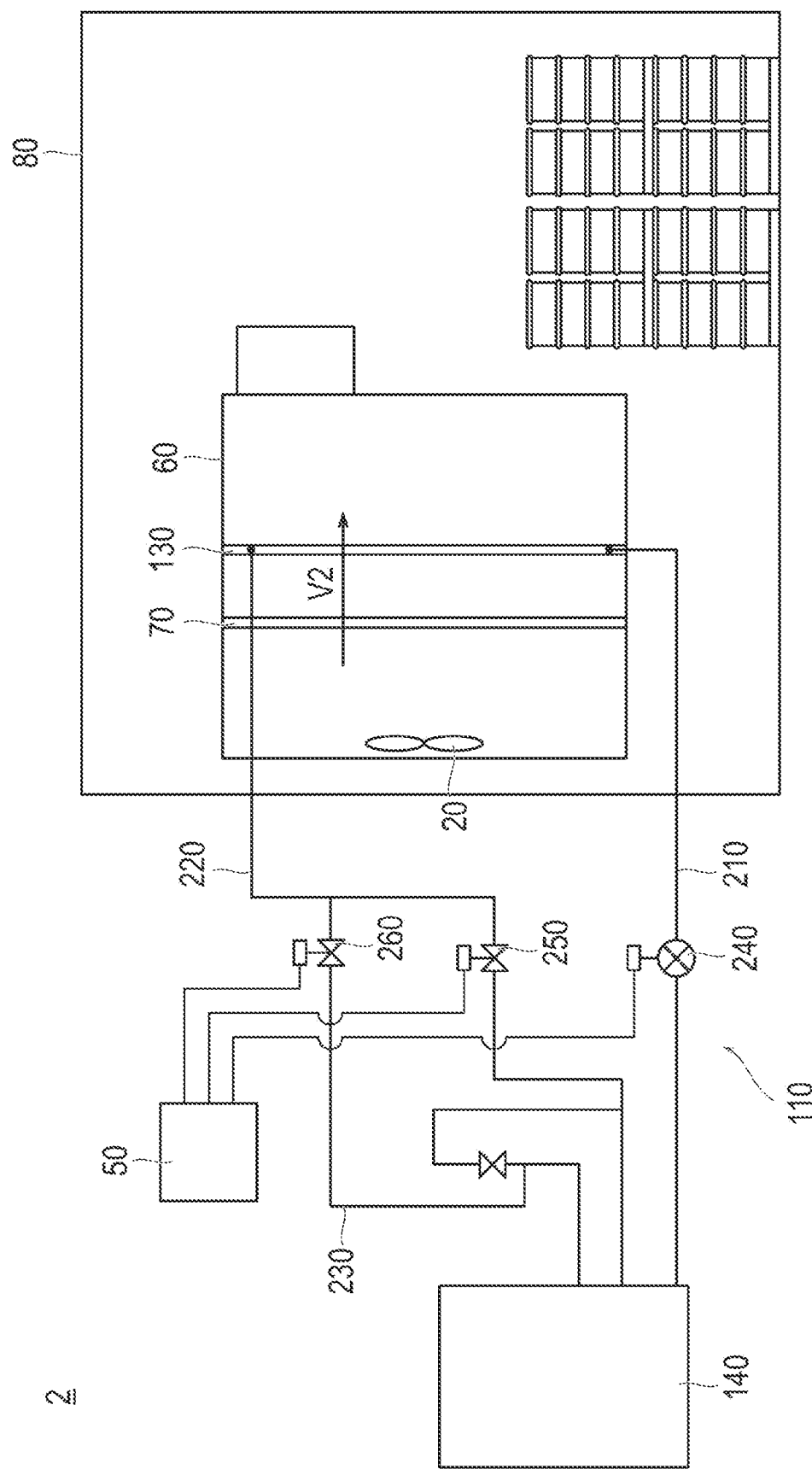
FIG. 4 is a schematic diagram showing a cooling device according to a second embodiment of the present invention.
Figure 5:
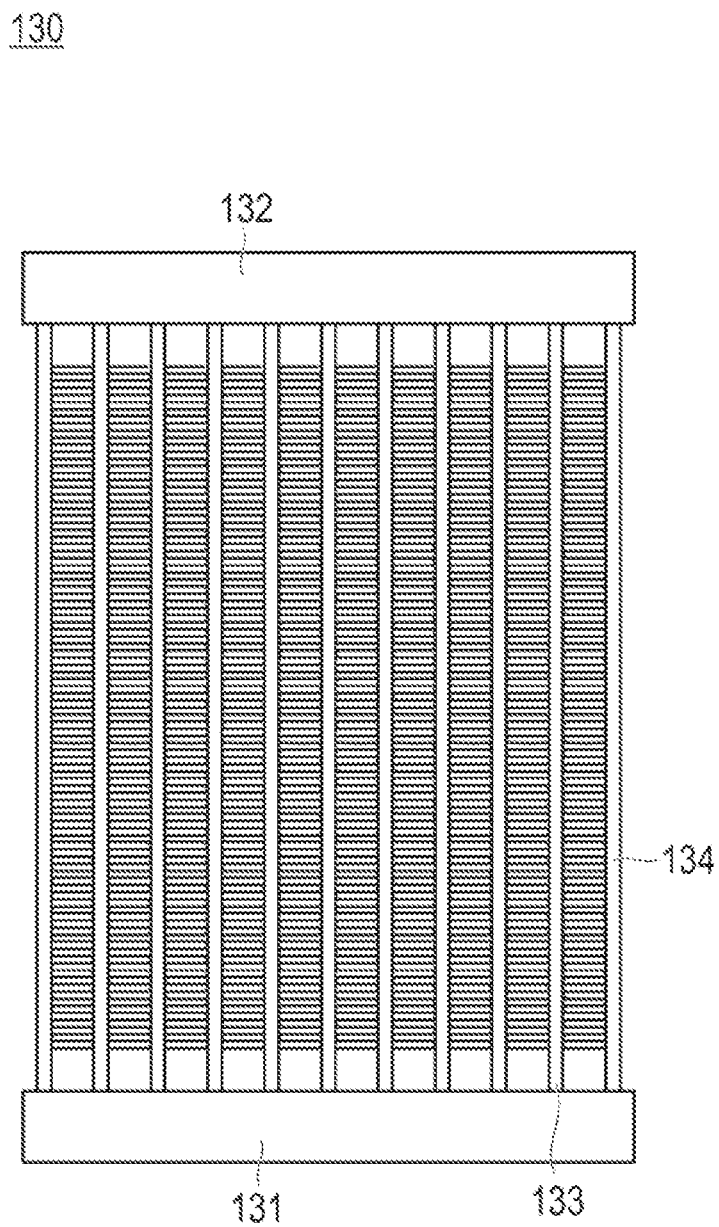
FIG. 5 is a schematic diagram showing a configuration of a heat exchange unit according to the second embodiment.

Subsequently, a second embodiment of the present invention is explained with reference to FIG. 4 and FIG. 5. Note that the same components as the components in the first embodiment are denoted by the same reference numerals and signs and explanation of the components is omitted. FIG. 4 is a schematic diagram showing a cooling device 2 according to the second embodiment of the present invention. FIG. 5 is a schematic diagram showing a configuration of a heat exchange unit 130 according to the second embodiment. The cooling device 2 according to the second embodiment is different from the configuration of the cooling device 1 according to the first embodiment in, for example, a direction of disposition of the heat exchange unit.

The cooling device 2 according to the second embodiment includes, as shown in FIG. 4, a generating unit 110 and a housing 80. The components are explained below.

The generating unit 110 brings moisture adhering to the heat exchange unit 130 into contact with air flowing into the generating unit 110 to thereby generate water vapor cooled while maintaining high humidity. The generating unit 110 includes, as shown in FIG. 4, a fan 20, a prefilter 70, the heat exchange unit 130, a condensing unit 140, an adjusting unit 50, and a casing 60. The fan 20, the prefilter 70, and the heat exchange unit 130 are configured to be covered by the housing 80.

As shown in FIG. 4, the fan 20 is provided on the left side of the heat exchange unit 130 (an air inlet side). The fan 20 sucks air after foods have been cooled at high humidity and blows the air toward the prefilter 70 and the heat exchange unit 130. That is, the fan 20 takes in, from the upper left shown in FIG. 4, the air after the foods have been cooled at high humidity and blows the air toward the upper right (see an arrow V2 in FIG. 4). By disposing the fan 20 to send wind in the horizontal direction in this way, it is possible to suitably store water in the heat exchange unit 130.

The condensing unit 140 includes a compressor and a condenser. The cooling device 2 according to the second embodiment is called "direct expansion cooling type". The cooling device 2 is connected by a refrigerant pipe, expands a refrigerant near a space to be cooled to perform heat exchange, and directly cools air.

The prefilter 70 is disposed between the fan 20 and the heat exchange unit 130. The prefilter 70 performs dust collection and straightening of the air moving in the casing 60. As the prefilter 70, for example, the same filter as the nonwoven fabric filter explained in the first embodiment can be used.

The heat exchange unit 130 performs heat exchange between the refrigerant cooled by the condensing unit 140 and the air circulating in the box and cools the air flowing in the heat exchange unit 130. The heat exchange unit 130 of the cooling device 2 according to the second embodiment is a microchannel heat exchanger. A configuration of the heat exchange unit 130 is explained below with reference to FIG. 5. FIG. 5 is a diagram of the heat exchange unit 130 viewed from the prefilter 70 side.

The heat exchange unit 130 includes, as shown in FIG. 5, two refrigerant headers 131 and 132, a plurality of heat transfer pipes 133 connecting the refrigerant headers 131 and 132 and arrayed in the up-down direction, and fins 134 disposed in contact with the heat transfer pipes 133 among the heat transfer pipes 133.

The air is blown by the fan 20 in a direction from the rear surface side (the left side in FIG. 4) to the front surface side (the right side in FIG. 4) of the heat exchange unit 130 and flows among the fins 134. On the other hand, the refrigerant flowing in the condensing unit 140 flows in from the refrigerant header 131 on a refrigerant inlet side, flows in a refrigerant channel formed on the insides of the heat transfer pipes 133, and flows to the refrigerant header 132 on a refrigerant outlet side.

The refrigerant in the refrigerant channel performs heat exchange with the air via the heat transfer pipes 133 and the fins 134.

The surfaces of the fins 134 are configured as heat transfer units that transfer cold of the refrigerant to the air. A state in which moisture included in the air and the foods adheres to the surfaces of the fins 134 is maintained by the adjusting unit 50. The fins 134 are disposed in the horizontal direction.

With the heat exchange unit 130 configured in this way, dew condensation water adheres to the fins 134 disposed in the horizontal direction because of a dew point temperature difference between the temperature of the fins 134 at the time when heat is transferred from the refrigerant and the temperature of the air that is in contact with the fins 134. Since a pitch of the fins 134 is narrow and surface tension is generated, the dew condensation water adheres to and is retained on the fins 134. Accordingly, the air blowing out from the heat exchange unit 130 is maintained in a high humidity state. Note that, when wind velocity at the time when the air passes through the heat exchange unit 130 is too high, since the dew condensation water scatters, it is preferable to control the rotating speed of the fan 20 as appropriate.

The generating unit 110 includes, as shown in FIG. 4, a first route 210 in which the refrigerant circulates from the compressor and the condenser toward the heat exchange unit 130, a second route 220 in which the refrigerant circulates from the heat exchange unit 130 toward the compressor, and a third route 230 that couples the compressor (a discharge side) and the second route 220 and supplies heat generated in the compressor to the second route 220.

An expansion valve 240 is provided in the first route 210. The expansion valve 240 expands the refrigerant compressed by the compressor to be gasified, liquidized by the condenser, and flowing into the expansion valve 240 to thereby lower the temperature of the refrigerant.

A first adjustment valve 250 is provided in the second route 220. The first adjustment valve 250 adjusts the pressure in the second route 220 and adjusts the temperature of the refrigerant circulating in the second route 220. The first adjustment valve 250 adjusts the pressure in the second route 220 such that an evaporation pressure of the refrigerant in the evaporator is within a fixed range and adjusts a saturation temperature of the refrigerant circulating in the second route 220.

A second adjustment valve 260 is provided in the third route 230. The second adjustment valve 260 adjusts an amount of heat supplied to the second route 220. Consequently, it is possible to supply a desired amount of heat due to the refrigerant compressed and gasified by the compressor to a refrigerant gas in the second route 220 through the third route and control an overheat degree of the refrigerant gas circulating in the second route 220. Cooling performance is therefore improved.

Subsequently, a cooling method of the cooling device 2 according to the second embodiment is explained as an example with reference to FIG. 4. Note that the present invention is not limited to only the example explained below.

The adjusting unit 50 adjusts the rotating speed of the fan 20 such that face velocity of the air entering the prefilter 70 is 1.5 to 2.5 m/second or lower. An in-box circulation air volume in the housing 80 at this time is 20 to 40 m$^3$/min/kw.

The adjusting unit 50 adjusts an opening degree of the expansion valve 240 in a range of 5 to 95%. When the inside of the box is set to 0° C. and humidity of 90% or higher, the adjusting unit 50 adjusts an evaporation temperature of the refrigerant to −1.0 to −0.2° C. For example, if R410 is used as the refrigerant, the adjusting unit 50 adjusts an adjustment pressure of the first adjustment valve 250 in a range of 6.7 to 6.9 bar. The adjusting unit 50 adjusts an amount of heat in the second adjustment valve 260.

By circulating the air in the housing 80 in this state, for the air taken into the casing 60, first, dust collection in the air and straightening of the air are performed in the prefilter 70. For example, the air, the temperature T3 of which is 1° C., taken into the casing 60 is cooled while maintaining high humidity in the heat exchange unit 130 to thereby be blown out from the casing 60 as water vapor, the temperature T4 of which is 0° C. and the humidity of which is 90% or higher. Then, the air cools the vegetables and the like placed on the inside of the housing 80 at high humidity.

Note that the present invention is not limited to the embodiments explained above and can be variously modified within the scope of claims.

For example, the heat exchange unit may further include a heater. At this time, in winter (a minus temperature range) in a cold region like Hokkaido, the heat exchange unit can be used to heat taken-in air such that the inside of the box has a predetermined temperature (for example, 0° C.).

Figure 6:
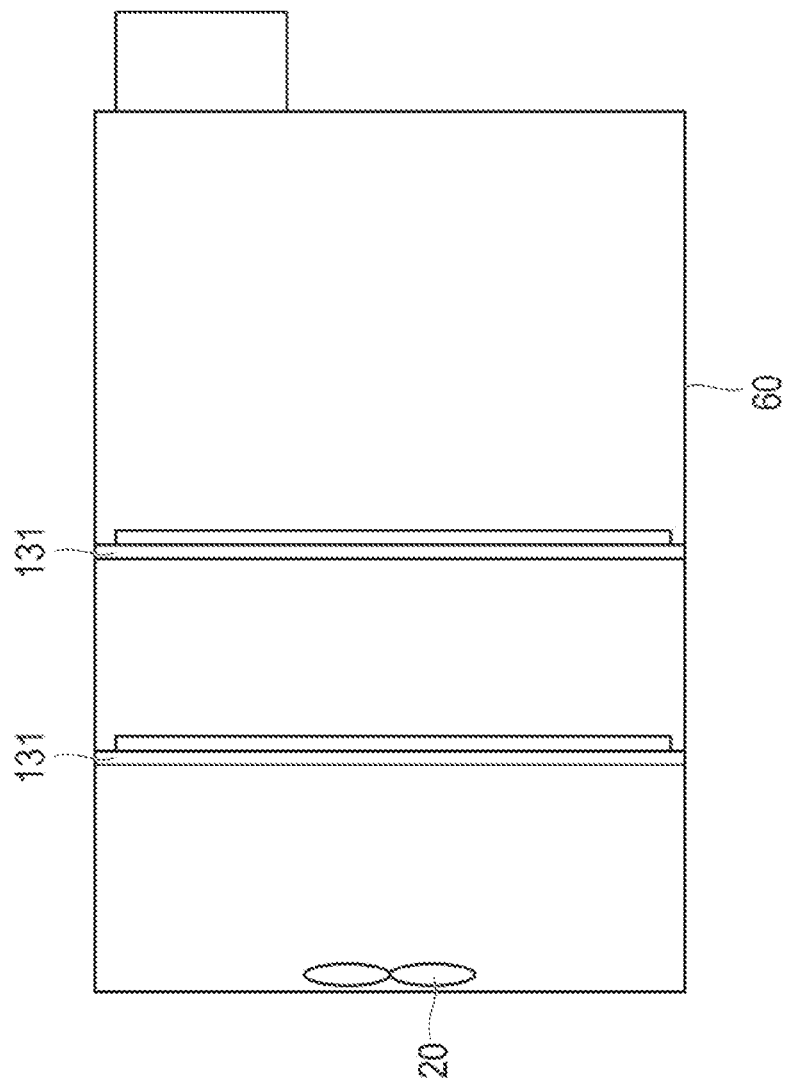
FIG. 6 is a schematic diagram showing a cooling device according to a modification.

In the second embodiment explained above, one microchannel heat exchanger is provided. However, as shown in FIG. 6, two or more microchannel heat exchangers may be provided along a flowing direction of the air. With this configuration, compared with the configuration in which the one microchannel heat exchanger is provided, it is possible to improve a cooling ability while suppressing an increase in the volume of the entire device.

In the embodiments explained above, the heat exchange unit 30 includes the heat exchanger 31 and the nonwoven fabric filter 32. However, the heat exchange unit may include only the heat exchanger 31 without including the nonwoven fabric filter 32.

In the first embodiment explained above, the indirect expansion cooling type is adopted as the cooling device 1. However, the cooling device 1 may be the direct expansion cooling type.

In the second embodiment explained above, the direct expansion cooling type is adopted as the cooling device 2. However, the cooling device 2 may be the indirect expansion cooling type.

REFERENCE SIGNS LIST

1, 2 Cooling device,
10, 110 Generating unit,
20 Fan,
30, 130 Heat exchange unit,
31, 131 Heat exchanger,
31A Heat transfer unit,
32 Nonwoven fabric filter,
32A Heat transfer unit,
40 Freezer,
50 Adjusting unit,
210 First route,
220 Second route,
230 Third route,
240 Expansion valve,
250 First adjustment valve,
260 Second adjustment valve.

The invention claimed is:

1. A cooling device that cools foods in a box at high humidity, the cooling device comprising:
   a heat exchanger configured to perform heat exchange between a medium circulating in the cooling device and air circulating in the box;
   a fan configured to take in the air in the box in which the foods have been cooled at high humidity and to blow the air toward the heat exchanger; and
   a controller configured to minimize a temperature difference between a temperature of a heat transferer of the heat unit exchanger and a temperature of the air taken in by the fan while maintaining a state in which moisture adheres to the heat transferer of the heat exchanger by adjusting an inlet temperature of the medium entering the heat exchanger and a rotating speed of the fan without using a sprinkler.

2. The cooling device according to claim 1, wherein the controller maintains a state in which moisture included in the air and the foods adheres to the heat transferer.

3. The cooling device according to claim 1, wherein
   the fan, the heat exchanger, and an outlet for the air subjected to the heat exchange in the heat exchanger are disposed in this order from a side where the air in a horizontal direction is taken in.

4. The cooling device according to claim 3, further comprising, between the fan and the heat exchanger, a prefilter that performs dust collection in the air and straightening of the air.

5. The cooling device according to claim 1, wherein the heat exchanger is a microchannel heat exchanger.

6. The cooling device according to claim 5, further comprising:
   a first route in which the medium circulates toward the microchannel heat exchanger through a compressor and a condenser;
   a second route in which the medium circulates from the microchannel heat exchanger toward the compressor;
   a third route that couples the compressor and the second route and supplies heat generated in the compressor to the second route;
   an expansion valve that is provided in the first route and expands the medium flowing out from the condenser;
   a first adjustment valve that is provided in the second route and adjusts pressure in the second route; and
   a second adjustment valve that is provided in the third route and adjusts an amount of the heat supplied to the second route.

7. The cooling device according to claim 1, wherein
   the fan, the heat exchanger, and an outlet for the air subjected to the heat exchange in the heat exchanger are disposed in this order from above in a vertical direction.

8. The cooling device according to claim 7, further comprising a nonwoven fabric filter.

9. The cooling device according to claim 1, wherein a direction in which the air subjected to the heat exchange by the heat exchanger flows and a direction in which the medium flows are the same.

10. A cooling method for cooling foods in a box at high humidity, the cooling method comprising, using the cooling device according to claim 1, in the state adjusted to maintain a state in which moisture adheres to the heat transferer of the heat exchanger that performs heat exchange between a medium circulating in the cooling device and air circulating in the box, to cause the air to flow to the heat exchanger.

* * * * *